United States Patent
Davis et al.

(10) Patent No.: US 8,874,332 B2
(45) Date of Patent: *Oct. 28, 2014

(54) SHIFTING VIRTUAL GEARS ASSOCIATED WITH A CONTINUOUSLY VARIABLE TRANSMISSION

(71) Applicant: Caterpillar Inc., Peoria, IL (US)

(72) Inventors: Kevin Davis, Washington, IL (US); Adam Nackers, East Peoria, IL (US); Michael D. Beyer, Chillicothe, IL (US); Shane C. McBride, Denver, CO (US)

(73) Assignee: Caterpillar Inc., Peoria, IL (US)

( * ) Notice: Subject to any disclaimer, the term of this patent is extended or adjusted under 35 U.S.C. 154(b) by 56 days.

This patent is subject to a terminal disclaimer.

(21) Appl. No.: 13/666,619

(22) Filed: Nov. 1, 2012

(65) Prior Publication Data
US 2014/0121918 A1     May 1, 2014

(51) Int. Cl.
| | |
|---|---|
| *B60K 6/54* | (2007.10) |
| *B60K 6/543* | (2007.10) |
| *B60W 10/11* | (2012.01) |
| *B60W 10/111* | (2012.01) |
| *F16H 61/66* | (2006.01) |
| *B60K 6/36* | (2007.10) |
| *B60K 6/547* | (2007.10) |

(52) U.S. Cl.
CPC ............... *F16H 61/66* (2013.01); *B60W 10/11* (2013.01); *B60W 10/111* (2013.01); *B60K 6/54* (2013.01); *B60K 6/543* (2013.01); *Y10S 903/909* (2013.01); *Y10S 903/91* (2013.01); *Y10S 903/911* (2013.01); *Y10S 903/915* (2013.01); *Y10S 903/917* (2013.01); *Y10S 903/945* (2013.01)

USPC .................. 701/55; 701/51; 701/54; 701/61; 701/62; 701/64; 701/95; 903/909; 903/910; 903/911; 903/915; 903/917; 903/945

(58) Field of Classification Search
CPC ............ B60K 6/36; B60K 6/54; B60K 6/543; B60K 6/547; B60K 2025/024; B60W 10/10; B60W 10/101; B60W 10/11; B60W 10/111; B60W 10/115; B60W 20/30
USPC ....................... 701/51, 54–55, 61–62, 64, 95; 903/909–911, 915, 917, 945
See application file for complete search history.

(56) References Cited

U.S. PATENT DOCUMENTS

| | | | |
|---|---|---|---|
| 6,151,977 A | 11/2000 | Menig et al. | |
| 6,482,122 B2 * | 11/2002 | Ochiai et al. | 477/42 |

(Continued)

FOREIGN PATENT DOCUMENTS

| | | |
|---|---|---|
| JP | 09250636 | 9/1997 |
| JP | 2002358133 | 12/2002 |

*Primary Examiner* — James Trammell
*Assistant Examiner* — Atul Trivedi
(74) *Attorney, Agent, or Firm* — Leydig, Voit & Mayer, Ltd.

(57) ABSTRACT

A system and method involves a machine having a power train including a continuously variable transmission (CVT) associated with a plurality of virtual gear ratios. To shift between the plurality of virtual gear ratios, the machine may include an operator input device that may be movable between a plurality of distinct positions. A first position may be associated with a neutral position in which no shifting of virtual gear ratios occurs. A second position of the operator input device may be associated with a first incremental rate for shifting between the virtual gear ratios. A third position may be associated with a second incremental rate for shifting between the virtual gear ratios which is different than the first incremental rate.

20 Claims, 6 Drawing Sheets

(56) References Cited

U.S. PATENT DOCUMENTS

| | | | |
|---|---|---|---|
| 7,451,031 B2* | 11/2008 | Kuwahara et al. | 701/51 |
| 7,840,329 B2* | 11/2010 | Katakura et al. | 701/61 |
| 8,180,535 B2* | 5/2012 | Taffin et al. | 701/51 |
| 8,447,479 B2* | 5/2013 | Umemoto et al. | 701/51 |
| 8,554,428 B2* | 10/2013 | Hubbard et al. | 701/54 |
| 2001/0056009 A1* | 12/2001 | Ochiai et al. | 477/121 |
| 2005/0054479 A1* | 3/2005 | Masterson et al. | 477/3 |
| 2006/0065467 A1 | 3/2006 | Schuh | |
| 2006/0073924 A1* | 4/2006 | Izumi et al. | 474/28 |
| 2008/0021622 A1* | 1/2008 | Katakura et al. | 701/61 |
| 2008/0076617 A1* | 3/2008 | Lee | 475/162 |
| 2008/0153664 A1* | 6/2008 | Tabata et al. | 477/37 |
| 2008/0254937 A1* | 10/2008 | Makiyama | 477/47 |
| 2009/0055062 A1 | 2/2009 | Tsukada et al. | |
| 2009/0088290 A1* | 4/2009 | Tabata et al. | 477/5 |
| 2009/0088936 A1* | 4/2009 | Hubbard et al. | 701/54 |
| 2009/0216414 A1* | 8/2009 | Rains | 701/55 |
| 2010/0211275 A1* | 8/2010 | Kobayashi et al. | 701/55 |
| 2011/0178684 A1* | 7/2011 | Umemoto et al. | 701/51 |
| 2012/0083976 A1* | 4/2012 | Fleming et al. | 701/55 |
| 2012/0130603 A1* | 5/2012 | Simpson et al. | 701/51 |
| 2013/0245903 A1* | 9/2013 | Hubbard et al. | 701/54 |

\* cited by examiner

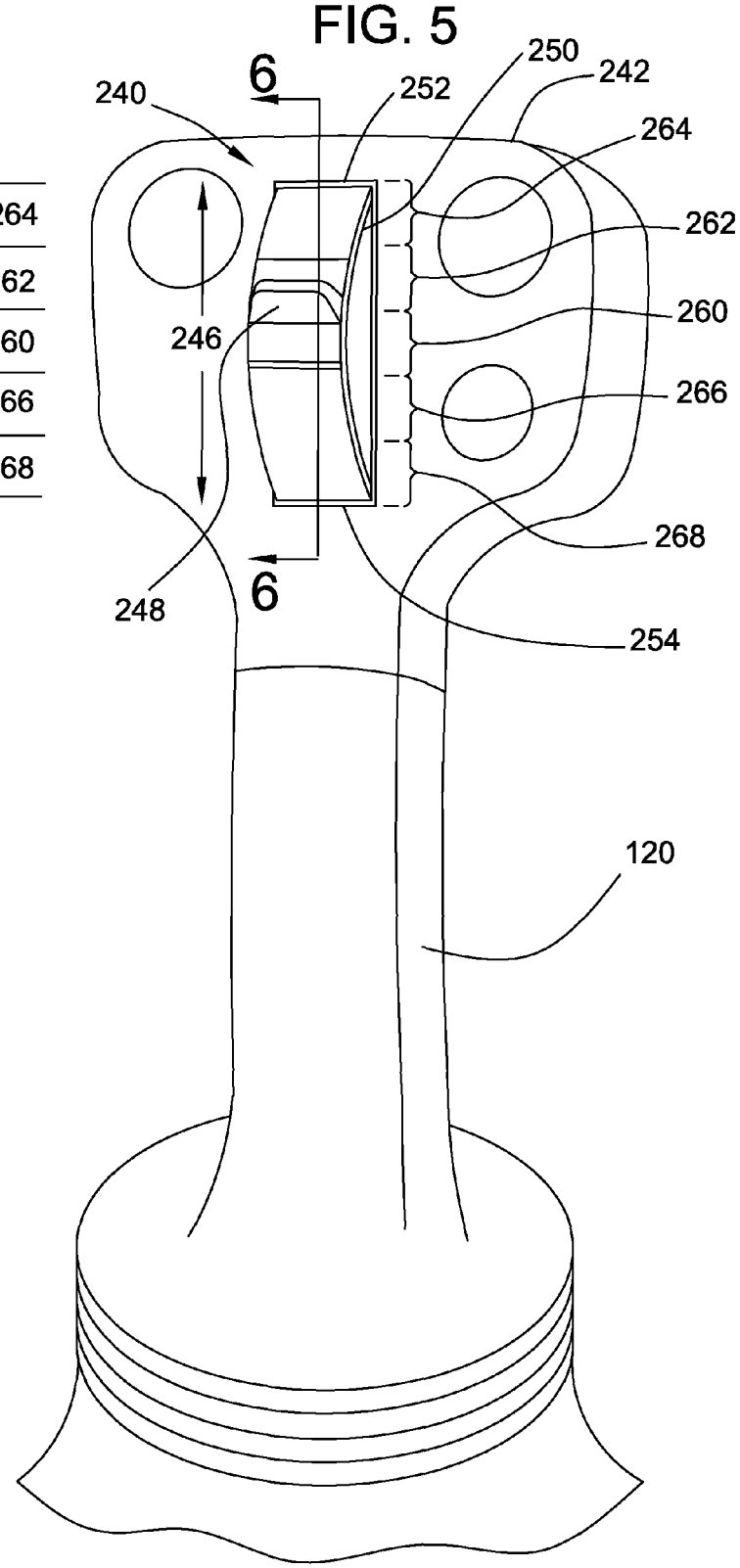

US 8,874,332 B2

SHIFTING VIRTUAL GEARS ASSOCIATED WITH A CONTINUOUSLY VARIABLE TRANSMISSION

TECHNICAL FIELD

The present disclosure relates generally to a machine equipped with a continuously variable transmission (CVT) and, more particularly, to a CVT adapted to operate in one or more discrete, virtual gear ratios.

BACKGROUND

Many machines use transmissions to couple the output of a prime mover or power source, for example, an internal combustion engine, to a driven element or device such as wheels or a work implement. Traditional transmissions typically included one or more fixed, selectably engageable gear ratios that could increase or decrease the speed of the prime mover and, usually in an inverse relationship, the torque. Specific gear ratios often correspond to discrete and known speed ranges of the driven device such that selection of a specific gear ratio will enable operation of the driven device within the that speed range. Accordingly, changing the desired speed and/or torque may require changing gear ratios that may be done in a step-controlled manner, i.e., gearing up or gearing down. Many operators of these machines have become accustomed to using traditional transmissions because they provide reliability and repeatability in operating the machine and, particularly, the driven device. For example, an operator may know that high gears are better suited for high-speed, low drag travel and lower gears are better suited for hauling operations or acceleration.

Recently, some manufacturers have equipped certain machines with continuously variable transmissions (CVTs) instead of the conventional, gear-based transmissions. A CVT provides an infinite or continuous range of torque-to-speed output ratios with respect to any given input from the prime mover. In other words, the output of the CVT may be increased or decreased across a continuous range in almost infinitesimally small increments. Thus, a CVT does not engage specific, discrete gear ratios to determine or control its output. However, some operators have expressed discomfort with CVTs because they lack the selectable and predicable gear ratios of conventional gear-based transmissions.

U.S. Pat. No. 7,641,588 ("the '588 patent"), assigned to the assignee of the present application, describes one approach to remedying or reducing operator discomfort and unfamiliarity with CVTs. According to the '588 patent, an electronic or computer-aided controller may be operatively associated with the CVT and/or the prime mover. The controller is configured to regulate operation of those devices within distinct output ranges provided by a plurality of discrete, predetermined speed ranges that an operator may selectively engage. The '558 patent thus provides virtual gear ratios resembling the actual gear ratios employed in conventional transmissions. The present disclosure is directed to furthering implementation and coordination of the virtual gear methodology with CVTs and to improving user operability of machines equipped with such capabilities.

SUMMARY

The disclosure describes, in one aspect, a method of regulating speed output of a machine having a CVT. The CVT is associated with a plurality of virtual gear ratios. The method registers movement of an operator input device from a first position to a second position. In response, the method shifts between virtual gears ratios from among the plurality of virtual gears ratios at a first incremental rate. The method may further register movement of the operator input device from the second position to a third position. In response to that registration, the method may shift between virtual gear ratios from among the plurality of virtual gear ratios at a second incremental rate.

In another aspect, the disclosure describes a machine including a CVT and an operator input device movable between a plurality of positions. The machine also includes a controller in communication with the operator input device and configured to control the CVT in accordance with a plurality of virtual gear ratios. The controller further associates a first position of the operator input device with a neutral position; a second position of the operator input device with a first incremental rate; and a third position of the operator input device with a second incremental rate.

In yet another aspect, the disclosure describes a method of regulating a CVT associated with a plurality of virtual gear ratios. A virtual gear ratio may be selected from the plurality of virtual gear ratios. The method may register a first operator input signal from an operator input device and, in response, may increase the virtual gear ratio selected at a first rate. The method may also register a second operator input signal from the operator input device and, in response, may increase the virtual gear ratio selected at a second rate.

BRIEF DESCRIPTION OF THE DRAWINGS

FIG. 5 is a perspective view of an operator control device including a multi-positional virtual gear shifter for shifting virtual gear ratios within the plurality of virtual gear ratios.

FIG. 6 is a cross-sectional view of the virtual gear shifter of FIG. 5 depicting a plurality of selectable, distinct positions associated with a multi-positional slider switch.

DETAILED DESCRIPTION

This disclosure relates to a machine equipped with a continuously variable transmission (CVT) to operatively couple and transfer mechanical power from a prime mover power source to a driven element. CVTs may be sometimes be referred to as infinitely variable transmissions (ITVs), however, the disclosure relates to both transmissions and any similar type of transmission regardless of nomenclature. As used herein, the term "machine" may refer to any type machine that performs some operation associated with an industry such as mining, construction, farming, transportation, or any other industry known in the art. Moreover, an implement may be connected to the machine. Such implements may be utilized for a variety of tasks, including, for example, loading, compacting, lifting, brushing, and include, for example, buckets, compactors, fork lifting devices, brushes, grapples, cutters, shears, blades, breakers/hammers, augers, and others. For example, the machine may be an earth-moving machine, such as a wheel loader, excavator, dump truck, backhoe, motor grader, material handler or the like. Additionally, the machine may be used in the transportation field such as on-highway trucks, cargo vans, or the like.

Figure 1:
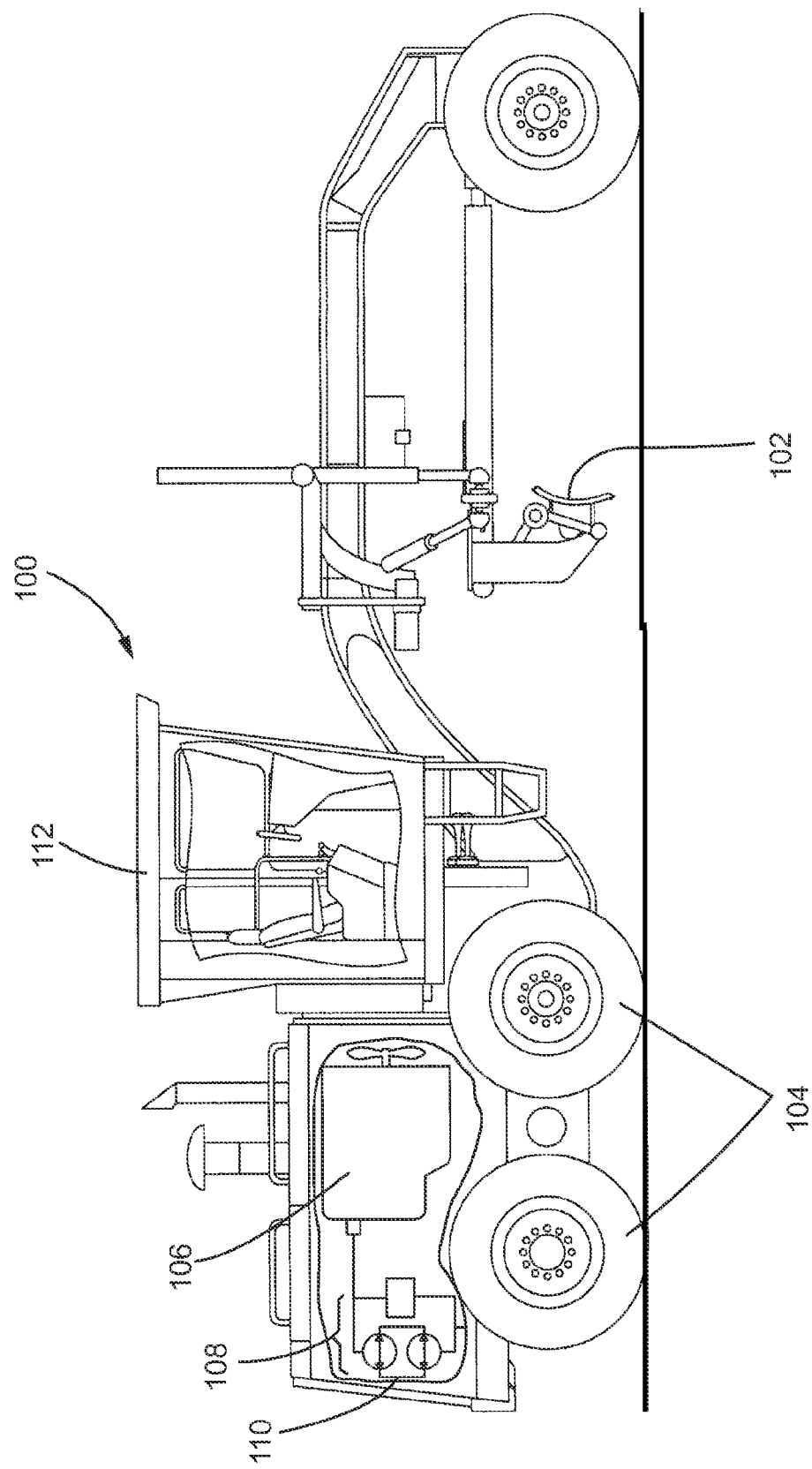
FIG. 1 is a diagrammatical, side elevational view of a mobile machine having a prime mover power source coupled to a driven element through an intermediate CVT.

Now referring to FIG. 1, wherein like reference numbers refer to like elements, there is illustrated an embodiment of a machine 100 and in particular a motor grader designed in accordance with the present disclosure. The machine 100 may be capable of alternating between high-speed, over-the-road travel and heavy, load-engaging operation. For example, the machine 100 may include a ground-engaging implement such as a blade 102 that may be power adjusted for flattening or smoothing a worksite surface. The machine 100 is suspended on ground engaging propulsion devices 104 such as wheels that may be disposed toward the front and the rear of the machine. In other machine embodiments, alternative propulsion devices 104 may include continuous tracks, belts, propellers, etc. To propel and direct the machine with respect to the ground, at least one set of wheels may be power-driven to rotate and another set may be steerable by an operator onboard, remotely, or by another control scheme.

Power for driving the wheels may be provided by a power source 106, sometimes referred to as a prime mover, that is disposed on the machine. A suitable example of a power source 106 is an internal combustion engine such as a compression ignition diesel engine that burns a hydrocarbon-based fuel or another combustible fuel source to convert the potential or chemical energy therein to mechanical power that may be utilized for other work. Other suitable types of power source 106 may include spark-ignition gasoline engines, turbines, hybrid engines, solar powered engines, and the like. To transfer the mechanical power produced by the power source 106 to the propulsion devices 104, the machine 100 may include a powertrain 108 operatively coupling the power source and the propulsion devices through an intermediate CVT 110. The powertrain 108 may also include various shafts, clutches, differentials, and other devices to transmit power and to assist in operation of the machine. Additionally, one or more power takeoffs (PTOs) may engage directly or indirectly with the powertrain 108 to redirect or retransmit a portion of the power to an auxiliary device such as the power actuated blade 102.

Figure 2:
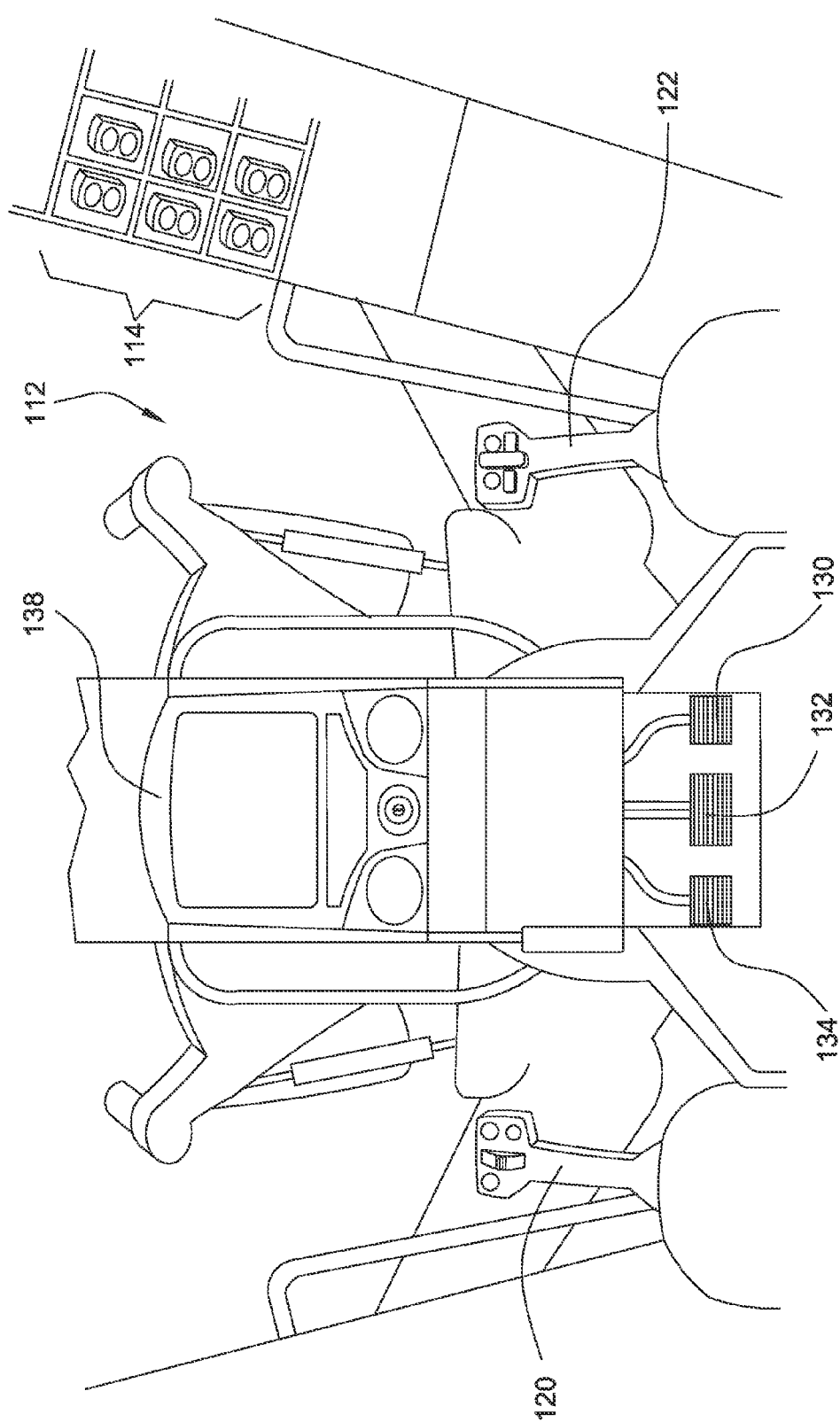
FIG. 2 is a fragmentary perspective view of an operator station of the machine including various accessible, operator-actuated controls and inputs for operating the machine.

To direct operation of the machine 100, an operator station 112 configured to accommodate an operator may be disposed on the machine in a location that allows visual command over the operating environment. Various controls and/or inputs 114 with which the operator may interact to maneuver and operate the machine 100 may be accessible inside the operator station 112. For example, referring to FIG. 2, the controls and/or inputs 114 may include a first control column or joystick 120 and a second joystick 122 disposed toward either side of the operator station 112. The operator may grasp and manipulate the joysticks 120, 122 to adjust operation of the machine or its implements. For example, the first joystick 120 may control steering and the second joystick 122 may control an implement. In other embodiments, a steering wheel or other suitable type of control may be included.

Further adjustment of the machine's operation may be implemented through one or more articulating pedals located toward the floor of the operator station 112. As is commonly known, an operator may depress or release a pedal through a range of displacement to bring about an expected response from the machine. In the illustrated embodiment, a right-oriented first pedal 130, center-oriented second pedal 132 and left-oriented third pedal 134 may be provided. For example, the first pedal 130 may function as a throttle pedal that the operator may modulate to indicate a desire to increase or decrease the acceleration and/or velocity of the machine. The second pedal 132 may be associated with a service brake that may retard rotation of the powertrain 108 to slow the machine. The service brake may physically engage the portions of the powertrain or may adjust one or more other operating conditions that may result in a decrease of machine speed output. The third pedal 134 may be associated with a clutch that may actuate or simulate engagement and/or disengagement of various components in the powertrain 108.

To visually interact with the operator, a visual display 138 including a screen or monitor may be located in the operator station 112. The visual display 138 may display, for example, information regarding operating parameters, performance characteristics, conditions, and variables regarding various aspects of the machine's operation. Common display information may include speed, direction, power source revolutions-per-minute (RPM), gear ratio, engine load, fuel level, and the like. The visual display 138 may be any suitable type of display including a liquid crystal display (LCD), a cathode ray tube (CRT), a plasma display or the like. Additionally, the visual display 138 may be configured to receive input from the operator through touch-screen technology, soft buttons and so forth. Various other types of switches, buttons, knobs, dials, levers and the like may be include at different locations in the operator station 112. For example, among the controls and/or inputs 114 may be a forward-neutral-reverse (F-N-R) control for controlling travel direction of the machine, i.e., forward or reverse, or some other operational parameters.

Figure 3:
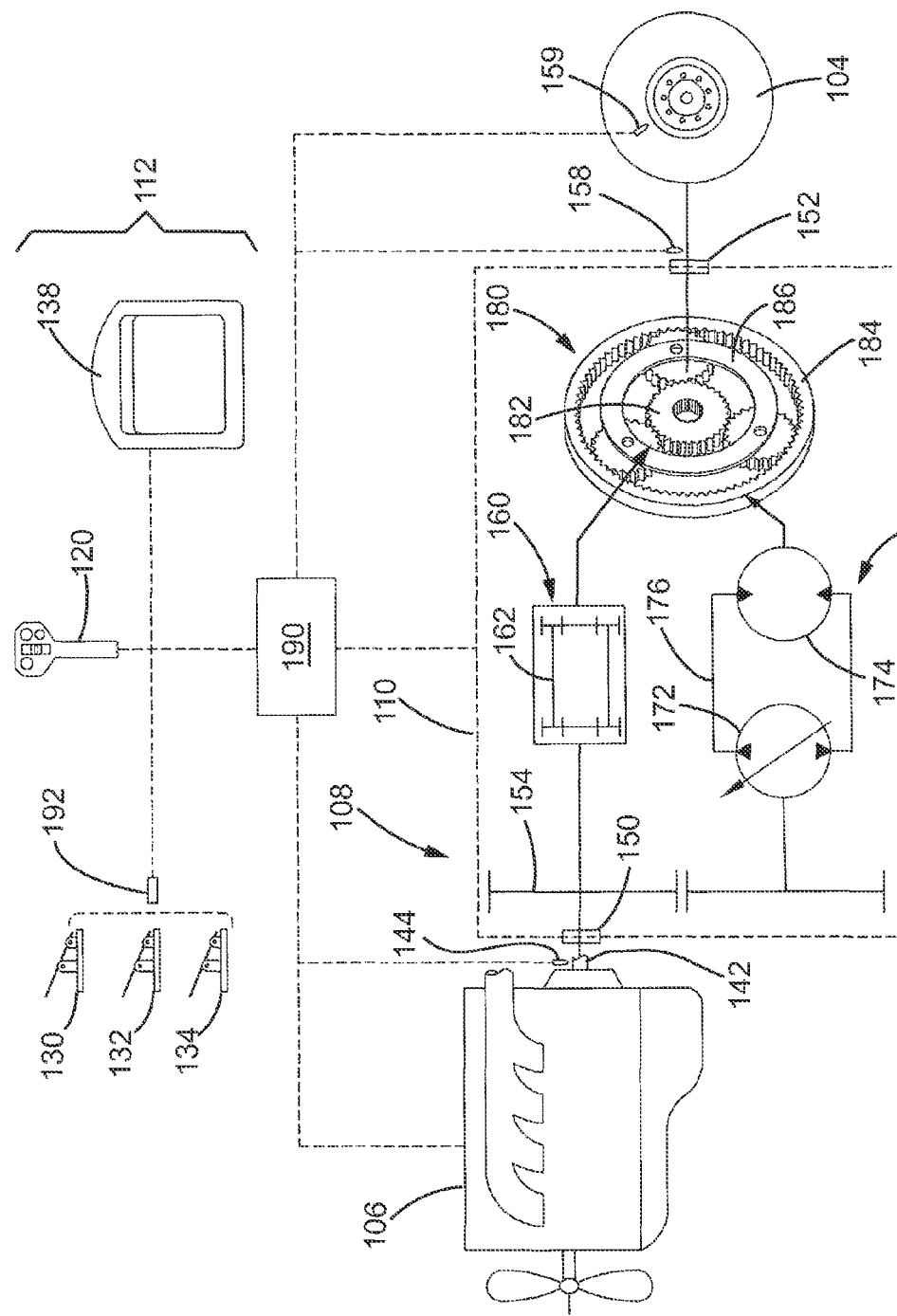
FIG. 3 is a schematic illustration of a powertrain of the machine including an embodiment of a CVT and a controller adapted to operate the CVT using a plurality of virtual gear ratios.

Referring to FIG. 3, an embodiment of the powertrain 108 for transferring mechanical power through the machine is illustrated in more detail. The prime mover power source 106, for example, a diesel-burning internal combustion engine, produces a rotational power output that may rotate a power source output 142, such as a drive shaft, extending from the power source. The speed and, in a somewhat related manner, the torque produced by the power source may be selectively varied. For example, considering a diesel-burning internal combustion engine, the speed and power output may be adjusted by increase or decreasing the quantity of fuel introduced and combusted in the engine, adjusting the displacement volume of the combustion chambers, etc. To measure, directly or indirectly, the rotational output speed produced by the power source 106, i.e., the power source speed, a power source sensor 144 may be associated with the power source output 142. By way of example, the power source sensor 144 may be a magnetic pickup type sensor that may sense a rotating magnetic field generated by a magnet associated with a rotating component of the power source output 142 such as the drive shaft, flywheel or the like. In other embodiments, the power source sensor 144 may be an optical pickup sensor that optical reads a visual indication on the rotating component. Other systems that may be associated with the power source 106 include fuel systems, air intake systems, exhaust systems, and the like.

To adjust the speed and/or torque of the rotational output produced by the power source 106, for example, by increasing speed and inversely affecting torque, the CVT 110 may be disposed down line of and operatively coupled to the power source output 142. As stated above, the CVT 110 may provide a continuous or infinite number of available torque-to-speed ratios for varying the output from the power source 106. In other words, the CVT 110, which is represented as a dashed-line box, may receive the rotational output though a CVT input member 150 associated with the power source output 142, and modify it in a controlled manner by changing the torque-to-speed ratio across a continuous range or spectrum before transmitting it through a CVT output member 152. To vary the torque-to-speed ratio, one or more operational characteristics of the CVT may be responsively controlled.

In the illustrated embodiment, the CVT 110 may be a split-path, hydromechanical CVT in which the rotational input from the CVT input member 150 is proportionally split into two parallel paths before being recombined at the CVT output member 152. The paths may include a mechanical power-transfer path 160 and a hydrostatic power-transfer path 170 disposed inside the CVT 110. To physically split the rotational input, a path splitter 154 coupled to a shaft of the CVT input member 150 may include a series of parallel, intermeshing gears that may duplicate and offset the rotational axis of the rotary input to align with either or both of the mechanical power-transfer path 160 and the hydrostatic power-transfer path 170.

The mechanical power-transfer path 160 may transfer the rotational power input from the CVT input member 150 to the CVT output member 152 by mechanical, dynamic techniques. For example, the mechanical power-transfer path 160 may embody a multispeed, bidirectional, mechanical transmission with various forward gears, reverse gears and/or clutches. The gears and/or clutches may be arranged in an adjustable and selectively engageable gear train 162 so that predetermined gear combinations may be engaged to produce a discrete output gear ratio. In this manner, the mechanical power-transfer path may function similarly to the traditional gear-based transmissions.

The hydrostatic power-transfer path 170 may transfer the rotational power output from the CVT input member 150 to the CVT output member 152 using fluid mechanics and hydraulics concepts. For example, the hydrostatic power-transfer path 170 may include a hydraulic pump 172 and a hydraulic motor 174 interconnected by a fluid transfer line 176 such as a flexible hydraulic hose that may channel hydraulic fluid. The hydraulic pump 172, which may be a variable displacement pump, swash plate, or the like, may be operatively coupled to the CVT input member 150 and may convert the rotary power input to hydraulic pressure by pressurizing the hydraulic fluid in the fluid transfer line 176. The fluid transfer line directs the pressurized hydraulic fluid to the hydraulic motor 174 to rotate an associated impeller or the like and reconvert the hydraulic pressure to a rotational output. A "gear ratio" or "effective gear ratio" of hydrostatic power-transfer path 170 may be altered by, for example, varying the displacement of the hydraulic pump 172 or changing the resistance of the fluid transfer line 176. Hydraulic displacement and/or resistance may be varied continuously within the operational limits of the CVT to provide an infinite number of effective gear ratios.

The outputs of the mechanical power-transfer path 160 and a hydrostatic power-transfer path 170 may be recombined using one or more gear assemblies operating in conjunction with the CVT output member 152. For example, the gear assemblies may include a planetary gear 180 including an inner sun gear 182, an outer ring gear 184, and an intermediary carrier 186 operatively engaged with each other. As will appreciated by those of skill in the art, the interrelationship and the relative rotation of the various gears in a planetary gear may be adjusted to produce a variety of different outputs including reversible outputs. For example, the speed at which ring gear 184 rotates relative to a ground, and the speed at which carrier 186 rotates relative to ring gear 184, may determine a rotational speed of sun gear 182. Accordingly, any combined gear ratio may be achieved by varying the discrete gear ratio of the mechanical power-transfer path 160, the variable gear ratio of the hydrostatic power-transfer path 170, and recombining them at different selected relations in the planetary gear 180, thus changing the output torque and speed characteristics of the CVT 110.

In other embodiments, the CVT may be a purely mechanical CVT using a series of selectable, interrelated gear trains such at the gear train 162 in FIG. 3. The purely mechanical CVT may also be realized as a variable diameter friction pulley system including two or more, parallel, inverted cone-like pulleys interconnected by a belt. An actuator may axially displace the belt with respect to the parallel pulleys to align at different diameters thereby producing variable torque and speed outputs. In other embodiments, the CVT may be a purely hydrostatic CVT similar to the hydrostatic power-transfer path 170 in FIG. 3. Furthermore, the CVT may be an electrical-magnetic CVT including a generator-motor combination. The rotational input may drive the generator to produce electricity that drives the motor to reproduce the rotational output. To continuously vary the torque-to-speed ratio, the electrical resistance between the generator and motor may be adjusted in increasingly small increments. In other embodiments, any other suitable type of CVT may be used.

To measure the rotational output of the CVT 110, a CVT sensor 158, such as a magnet pickup sensor or an optical sensor, may be associated with the CVT output member 152 to sense the rotational speed produced. In another embodiment, the torque output of the CVT 110 may be determined by a sensor disposed in the fluid transfer line 176 that measures hydraulic pressure therein. The torque transfer through the CVT may then be estimated from the measured hydraulic pressure and any possible transmission losses or inefficiencies may be accounted for. The powertrain 108 may terminate at a propulsion device 104, such as a rotatable wheel that engages the ground and propels the machine. Various axels, differentials and the like may facilitate the engagement of the powertrain 108 to the wheel. To measure an actual machine speed a ground sensor or the like (not illustrated) may be provided. In the embodiment of FIG. 3, a machine speed sensor 159, such as a magnetic pickup or optical sensor, may be associated with the wheel. Machine speed, i.e., distance traveled per time, may be calculated by multiplying the revolutions per second of the wheel by the circumference of the wheel. In various embodiments, the machine speed sensor or another sensor may determine if the propulsion device is slipping or spinning out with respect to the ground.

To coordinate and control the various components in the powertrain 108 including the CVT 110, the machine may include an electronic or computerized control unit, module or controller 190. The controller 190 may be adapted to monitor various operating parameters and to responsively regulate various variables and functions affecting the powertrain. The controller 190 may include a microprocessor, an application specific integrated circuit (ASIC), or other appropriate circuitry and may have memory or other data storage capabilities. The controller may include functions, steps, routines, data tables, data maps, charts and the like saved in and executable from read-only memory or another electronically accessible storage medium to control the engine system. Storage or computer readable mediums may take the form of any media that provides instructions to the controller for execution. The mediums may take the form of non-volatile media, volatile media, and transmission media. Non-volatile media includes, for example, optical or magnetic disks. Volatile media includes dynamic memory. Transmission media includes coaxial cables, copper wire and fiber optics, and may also take the form of acoustic or light waves, such as those generated during radio-wave and infra-red data communications. Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer or processor may read. Although in FIG. 3, the controller 190 is illustrated as a single, discrete unit, in other embodiments, the controller and its functions may be distributed among a plurality of distinct and separate components. To receive operating parameters and send control commands or instructions, the controller may be operatively associated with and may communicate with various sensors and controls in the powertrain 108. Communication between the controller and the sensors may be established by sending and receiving digital or analog signals across electronic communication lines or communication busses. The various communication and command channels are indicated in dashed lines for illustration purposes.

For example, to register a desired increase or decrease in the speed or power output of the machine, the controller 190 may communicate with a pedal sensor 192 operatively associated with one or more of the first, second and third pedals 130, 132, 134. If the operator were to module the first pedal 130 functioning as a throttle pedal, the pedal sensor 192 may register the degree or amount of modulation and may generate an operator input signal in response. The pedal sensor 192 communicates the operator input signal to the controller 190 that may adjust operation of one or more components in the power train 108 to increase or decrease speed and/or output. The controller 190 may also communicate with the first and/or second joysticks 120, 122 to register an input command intended to steer the machine or adjust the implements. The controller 190 may also communicate with the visual display 138 and may send and receive information with the display.

To further regulate operation of the machine, the controller 190 may communicate with other sensors and/or controls disposed about the machine. For example, to monitor the output speed and/or torque produced by the power source 106, the controller 190 may communicate with the power source sensor 144. For the described internal combustion engine producing a rotational force, the monitored speed may be in revolutions per minute (RPM). Likewise, to monitor the changes to the torque-to-speed output affected by the CVT 110, the controller may communicate with the CVT sensor 158 or may directly measure the hydrostatic pressure in the fluid transfer line 176. The controller 190 may also determine or estimate the actual machine speed, regardless of transmission concerns in the powertrain 108, by directly communicating with the machine speed sensor 159 associated with the propulsion device 104. The controller 190 may be configured to adjust other actuators and controls about the machine to responsively regulate operation of the power source 106 and/or CVT 110.

Figure 4:
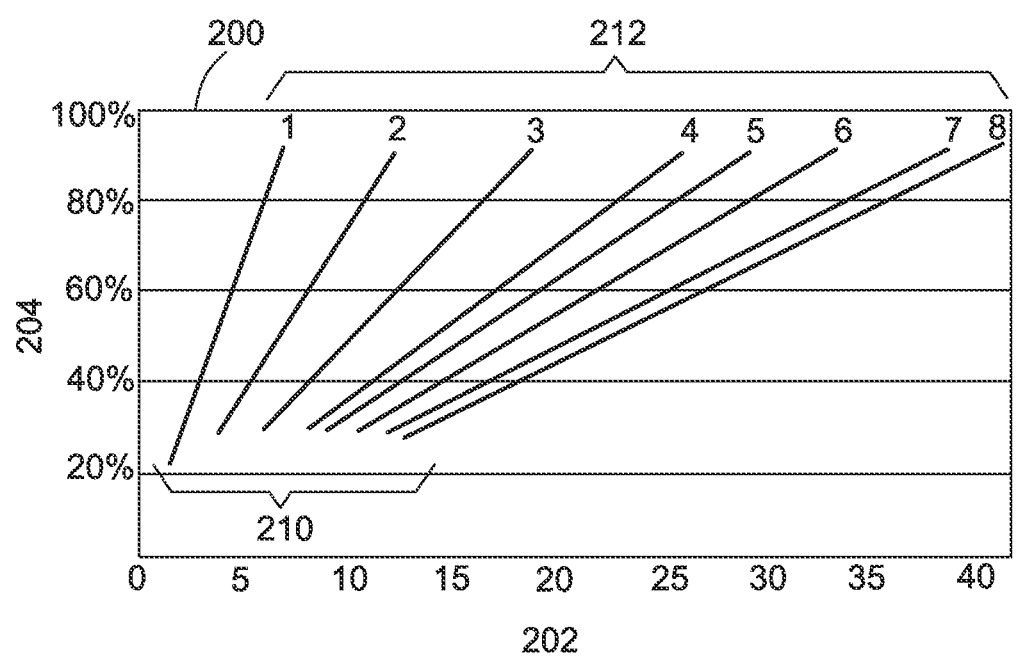
FIG. 4 is an illustration of an embodiment of a control map or table for correlating a plurality of virtual gear ratios associated with the CVT to the speed of the machine.

As described above, the controller may regulate the output speed and/or torque of the CVT within discrete ranges by associating those ranges with a plurality of operator-selectable virtual gear ratios. Any suitable number of virtual gear ratios may be utilized including fractions or increments of discrete virtual gear ratios. The virtual gear ratios may be associated with the forward and/or reverse directions of the machine. Referring to FIG. 4, there is illustrated a virtual gear map 200 that reflects the relation between available machine speed 202 along the X-axis and throttle input 204 quantified, for example, as a percentage of modulation of the first pedal, along the Y-axis via a plurality of virtual gear ratios that, in the illustrated example, may include gears (1) through (8). The virtual gear map 200, which may be programmed into the controller, thereby correlates virtual gear ratios (1)-(8) to the available output speeds 202 of the CVT and/or machine plotted along the X-axis. Each virtual gear ratio (1)-(8) is represented as an upward slopping, angled line and each virtual gear ratio has an associated range of virtual gear speeds between a minimum virtual gear speed 210 at the lower end of the line and a maximum virtual gear speed 212 at the higher end. For example, in the illustrated embodiment, virtual gear ratio (1) may have a minimum virtual gear speed 210 that corresponds to an intended machine speed of about 2 kilometers per hour (kph) and may have a maximum virtual gear speed 212 that corresponds to an intended machine speed of about 5 kph. Virtual gear ratio (2) may correspond to an intended machine speed of between about 4 and 12 kph. Virtual gear ratio (8) may have a maximum virtual gear speed corresponding to an intended maximum speed of the machine, e.g., 40 kph.

Thus, the plurality of virtual gear ratios (1)-(8) provide a series of increasing higher and overlapping available speed ranges. The operator may smoothly shift between adjacent virtual gear ratios due to the overlapping speed ranges. Moreover, in various embodiments, the speed ranges for each virtual gear ratio (1)-(8) may generally correspond to known travel speeds of conventional gear-based transmissions. To alter the machine speed within the range available for each virtual gear ratio, the virtual gear map 200 charts modulation of the throttle or first pedal as a percentage 204, along the Y-axis. As the first pedal functioning as the throttle is depressed in increasing degrees of modulation, the output speed of the CVT may increase by following the upward sloping lines associated with each virtual gear ratio (1)-(8). If the maximum virtual gear speed 212 for the selected virtual gear ratio is reached, the operator may shift to another virtual gear ratio to engage another range of virtual gear speeds. Accordingly, the operator may shift upward through the plurality of virtual gear ratios to direct the CVT and thus the machine to produce increasing output speeds 202 and a wider range of output speeds. Information about the selected virtual gear ratio and the available speeds associated with it may be displayed on the visual display in the operator station. In other embodiments, the control maps may appear differently and include different parameters, variables, curves and the like.

To enable the operator to shift between the plurality of virtual gear ratios, an operator input device and, more specifically, a virtual gear shifter 240 may be included with the machine. Referring to FIG. 5, the virtual gear shifter may be disposed on the handle and, in particular, the handgrip 242 of the first joystick 120 to simplify access for the operator, though other suitable locations are contemplated. The virtual gear shifter 240 may be embodied in part as a multi-position slider switch 244 or shuttle that is translatable with respect to the handgrip 242 along a linear direction 246 indicated by the arrow in FIG. 5. The slider switch 244 may be accommodated in an elongated, recessed track 250 disposed in the handgrip 242 and can slide back and forth between a first or forward edge 252 and a second or rearward edge 254 of the track. To facilitate movement of the slider switch 244, the switch and/or track 250 may have a slightly arched or curved shape with respect to the plane of the handgrip 242. Additionally, a vertical lever 248 may protrude from the slider switch 244, away from the plane of the handgrip 242, that may be manipulated by an operator's fingers or thumb. Instead of a slider switch, though, in other embodiments, the virtual gear shifter 240 may take other forms including, for example, a toggle switch, a rocker switch, a rotatable knob, a lever, push buttons such as set and release buttons, or any other suitable actuator or control. Moreover, in other embodiments, the virtual gear shifter 240 may be realized as a virtual, visual display such as one implemented on a touch screen device. In any such form, the virtual gear shifter 240 may register an operator input indicative of a desire to shift virtual gear ratios. As illustrated, the handgrip 242 may include other buttons, switches or control devices.

In the particular embodiment illustrated, by slidably moving the slider switch 244 in the linear direction 246 with respect to the handgrip 242, the changed positions of the slider switch may be registered as a command to increase or decrease the selected virtual gear ratio, i.e., shifting up or down. In the multi-positionable embodiment, the different positions of the slider switch 244 may correspond to different desired increments or rates of shifting. For example, the slider switch 244 may be positionable in five distinct positions with respect to the length of the track 250 between the forward edge 252 and the rearward edge 254, although in other embodiments, different numbers of positions may be available. An initial or first position 260 may correspond to a mid-length location of the track 250. A second position 262 may be located immediately forward of the first position 260 and a third position 264 may be located forward of the second position and adjacent the forward edge 252 of the track 250. Similarly, a fourth position 266 may be located immediately rearward of the first position 260 and a fifth position 268 may be located rearward of the fourth position and adjacent the rearward edge 254. As used herein, terms of orientation such as "forward" and "rearward" are used for reference only and are not intended as a limitation of the claims.

To facilitate positioning of the slider switch 244, referring to FIG. 6, a plurality of detents 270 may be included to demarcate the various positions of the switch. In particular, a set of detents 270 may be located at the transition point between the second position 262 and the third position 264 and another set of detents may be located at the transition point of the fourth position 266 and the fifth position 268. In a further embodiment, sets of detents 270 may also be placed at the transition points between the first position 260 and the second position 262 and fourth position 266 respectively. A corresponding structure 272 on the slider switch 244 may slidably engage with the detents 270 to provide a tactile and/or audible sensation, such as a snap, when the switch moves past the detents. In an embodiment, the detents 270 may constrain the slider switch 244 in the selected position absent further forcible movement of switch. However, in another embodiment, the slider switch 244 may be spring-actuated to return, under the urging of a spring, to a previous position such as, for example, the mid-length first position 260. Any suitable type of electrical, mechanical or electro-mechanical contacts may be operatively associated with the slider switch to register its relative position and movement between positions. Selected engagement of the various contacts may produce an operator input signal such as an electrical or electronic signal indicative of an operator's desired input. This information may be communicated to the controller for appropriate processing.

In a specific embodiment, the different positions of the slider switch 244 may correspond to different incremental amounts or degrees by which a change in the virtual gear ratios is directed. For example, the mid-length first position 260 may correspond to a neutral position indicating that no shift between virtual gear ratios is desired. The second position 262 may correspond to a relatively small incremental increase or up-shifting of the virtual gear ratios and the forward-most, third position 264 may correspond to a relatively larger incremental increase in virtual gear ratios. Likewise, the fourth position 266 may correspond to a relatively smaller incremental decrease or decrement, i.e., a downshift, in the virtual gear ratio and the rearward-most fifth position 268 may correspond to a relatively larger incremental decrease, or decrement. In a further embodiment, because the CVT is actually capable of nearly infinite and continuous range of virtual gear ratios, including integer and fractions of the virtual gear ratios, the intermediate second and fourth positions 262, 266 may correspond to directives to increment by, respectively, increasing or decreasing in fractions of the predetermined virtual gear ratios. In contrast, the distal third and fifth positions 264, 268 may correspond to directive to increment by ratio integers or whole virtual gear ratios. In this sense, the term "increment" may refer to the amount or quantity by which the virtual gear ratios change. In other embodiments, the different positions may correspond to different rates by which virtual gear ratios are altered or changed i.e., the speed at which the virtual gear ratios change.

INDUSTRIAL APPLICABILITY

Figure 7:
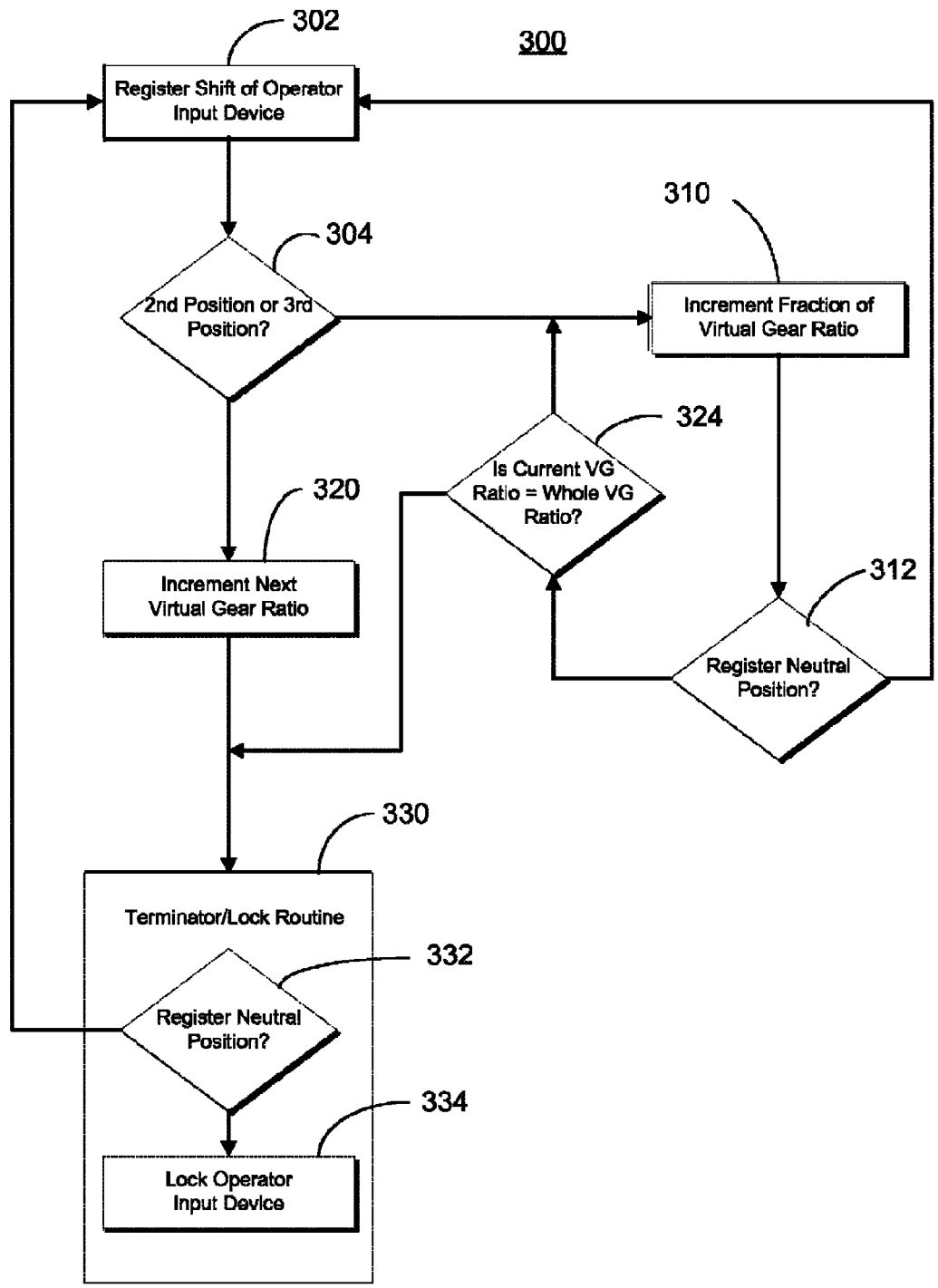
FIG. 7 is a flowchart illustrating a possible routine or process for shifting among the plurality of virtual gear ratios using the virtual gear shifter of FIG. 5.

In accordance with the aspect of the disclosure, the multi-positionable virtual gear shifter facilitates and simplifies operator interaction with a CVT configured to operate in accordance with a plurality of virtual gear ratios, including possibly integers and fractions of virtual gear ratios. For example, illustrated in FIG. 7 is an embodiment of a methodology in the form of a flowchart 300 that may be implemented as a computer-executable routine, module or series of instructions, for receiving and responding to operator input signals from a device such as the slider switch 244 shown and described in FIG. 5. Referring to FIGS. 5 and 7, the methodology may start with a shift registration step 302 in which an operator's movement of the slider switch 244 is registered. In a position decision step 304, the method determines the distinct position to which the slider switch 244 has been moved, which may correspond to the operator's desired gear shift strategy. For example, if the slider switch 244 is displaced forward in the track 250, the position decision step 304 can determine if the displaced switch corresponds to the intermediate second position 262 or the forward-most third position 264. Of course, in the event the slider switch 244 is displaced rearward, the position decision step 304 can determine if the fourth or fifth positions 266, 268 were selected. If the slider switch 244 is unmoved and remains in the neutral first position 260, the shift registration step 302 will not occur and the position decision step 304 is not invoked.

If, however, the second position 262 is selected, the method may interpret that selection as a directive to increment the virtual gear ratio by a relatively small predetermined amount, such as by a fractional amount of a whole virtual gear ratio. This may be accomplished by a fractional incrementing step 310. By way of example, the fractional predetermined amount may be on the order of 0.2 virtual gear ratios, although in other embodiments, different magnitudes or degrees may be utilized. Additionally, the predetermined amount may be operator adjustable. For the example provided, if the operator moves the slider switch 244 to the second position 262, the fractional incrementing step 310 may up-shift from virtual gear ratio (3.0) to virtual gear ratio (3.2). In further embodiments, the fractional incrementing step 310 may be a finite occurrence or it may occur repeatedly under certain conditions. For example, according to the method, the operator may indicate a desire to increment by the predetermined fractional amount a single time as an isolated occurrence by promptly returning the slider switch 244 to the neutral first position 260. Movement of the switch 244 to the neutral first position 260 may be registered by a first neutral position registration step 312. In such case, no further incrementing occurs.

However, the operator may indicate a desire to sequentially increase the virtual gear ratio by continuing to invoke the fractional incrementing step 310. To do so, the operator may maintain, forcibly if necessary, the slider switch 244 in the second position 262. Such positioning may also be determined by the first neutral position registration step 312, and the method may return to the fractional incrementing step 310 to again increase the virtual gear ratio by the predetermined fractional amount. This may occur repetitively so that the selected virtual gear ratio continues to sequentially increase by the predetermined amount, e.g., virtual gear ratio (3.0) to virtual gear ratio (3.2) to virtual gear ratio (3.4), etc.

If the position decision step 304 instead determined that the operator moved the slider switch 244 to the third position 264, the methodology may interpret this as a directive to increase the virtual gear ratio by a relatively larger magnitude, for example, by an integer or whole gear ratio. The method may therefore proceed to an integer incrementing step 320 to increment by a whole virtual gear ratio, e.g., virtual gear ratio (4) to virtual gear ratio (5). In a further specific embodiment, to improve the selectability of distinct virtual gear ratios in instances where fractions of virtual gear ratios are available, the integer incrementing step 320 may proceed to the next highest integer, e.g., virtual gear ratio (4.5) to virtual gear ratio (5). This feature may simplify tracking of the virtual gear ratios for the operator, who may slide the slider switch 244 to the third position 264 and thereby shift to the next recognizable whole virtual gear ratio. In such an embodiment where the incrementing step 320 is clipped at that the next whole virtual gear ratio, the actual increase in the gear ratio may correspond to the increase from a fractional incrementing step 310, e.g., virtual gear ratio (3.8) to virtual gear ratio (4.0). In other embodiments, the integer incrementing step 320 may increase the virtual gear ratio by a single, whole digit regardless of the initial value of the gear ratio, e.g., virtual gear ratio (3.5) to virtual gear ratio (4.5).

To prevent unintentionally incrementing the selected virtual gear ratio by an excessive or perpetual amount such may occur if the slider switch 244 becomes stuck in the second or third positions 262, 264, the methodology may include a termination/lock routine 330. For example, after the integer incrementing step 320 has successfully incremented the selected virtual gear ratio to the next highest integer value, the process may proceed to the termination/lock routine 330. The termination/lock routine 330 may prevent further incrementing until the operator moves the slider switch 244 back to the neutral first position 260. This may be determined in a second neutral position registration step 332. If the operator does not properly reposition the slider switch 244 to the neutral first position 260, the termination/lock routine 330 proceeds to a locking step 334, so that the methodology ignores or no longer responds to operator input signals from the operator input device associated with the slider switch. The lock-down condition implemented by the locking step 334 may continue until the operator moves the slider switch 244 back to the neutral first position 260 and an appropriate signal is communicated to the controller. A runaway condition wherein the virtual gear ratio continuously increments is thereby prevented. The operator may, however, repetitively shuttle the slider switch 244 between the first position 260 and the third position 264 in an intentional and controlled manner to repeatedly increase the selected virtual gear ratio by integers values.

If the method is implementing the fractional incrementing step 310 that allows for repetitive incrementing of the virtual gear ratios, the method may approach the termination/lock routine 330 by a different approach. For example, the fractional incrementing step 310 may repeat for a predetermined number of times until the next integer virtual gear value or whole virtual gear ratio is achieved. (E.g., virtual gear ratio (3.6) to virtual gear ratio (3.8) to virtual gear ratio (4.0), stop). This may be determined in a virtual gear assessment step 324 that queries whether the selected virtual gear ratio is equal to an integer value and, if so, the method may proceed to the termination/lock routine 330 to prevent further incrementing until the operator moves the slider switch back to the neutral first position. If, instead, the virtual gear assessment step 324 determines that the fractional incrementing step 310 has yet to reach the next whole virtual gear ratio value, the method may continue to invoke the fractional incrementing step 310 to increase the selected virtual gear ratio. Hence, the operator may repetitively increase the virtual gear ratios in responsible, fractional amounts and the method can still avoid unintentional, perpetual increases.

The method provides a way for an operator to increase or decrease the virtual gear ratio selected for a CVT using different incremental rates. Accordingly, the lower or fractional rate may be used to fine-tune the gear ratios while the larger or integer rates may allow for a substantial increase where appropriate. Additionally, in the embodiments in which the larger rate increments to the next highest integer of a virtual gear ratio, regardless of the initial and possibly fractional virtual gear ratio, the operator may be able to establish a known or familiar gear ratio from among the nearly infinite ratios possible. In an embodiment, the first incremental rate and second incremental rates may be adjustable. Likewise, the rates and other information about the selected virtual gear ratios may be presented on the visual display in the operator station. The method may be applicable in both the forward and reverse directions of the machine.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A method of regulating speed output of a machine having a continuously variable transmission (CVT), the CVT associated with a plurality of virtual gear ratios; the method comprising:
   registering movement of an operator input device from a first position to a second position;
   shifting between virtual gears ratios from among a plurality of virtual gears ratios at a first incremental rate;
   registering movement of the operator input device from the second position to a third position; and
   shifting between virtual gear ratios from among the plurality of virtual gear ratios at a second incremental rate.

2. The method according to claim 1, wherein the first incremental rate is less than the second incremental rate.

3. The method according to claim 2, wherein the plurality of virtual gear ratios include integers of virtual gear ratios and fractions of virtual gear ratios.

4. The method according to claim 3, wherein the first incremental rate shifts between fractions of virtual gear ratios.

5. The method according to claim 4, wherein shifting at the first incremental rate terminates at a next integer of a virtual gear ratio.

6. The method according to claim 3, wherein the second incremental rate shifts to a next integer of a virtual gear ratio.

7. The method according to claim 6, wherein the second incremental rate terminates until movement of the operator input device to the first position is registered.

8. The method according to claim 1, further comprising:
   registering movement of the operator input device to a fourth position;
   shifting between virtual gear ratios at a first decremental rate;
   registering movement of the operator input device to a fifth position; and
   shifting between virtual gear ratios at a second decremental rate.

9. The method according to claim 1, wherein the operator input device is a slider switch.

10. A machine comprising:
    a continuously variable transmission (CVT);
    an operator input device movable between a plurality of positions;
    a controller in communication with the operator input device, the controller configured to control the CVT in accordance with a plurality of virtual gear ratios;
    wherein the controller associates a first position of the operator input device with a neutral position; associates a second position of the operator input device with a first incremental rate for incrementing the plurality of virtual gear ratios; and associates a third position of the operator input device with a second incremental rate for incrementing the plurality of virtual gear ratios.

11. The machine according to claim 10, wherein the first incremental rate is less than the second incremental rate.

12. The machine according to claim 11, wherein the plurality of virtual gear ratios include integers of virtual gear ratios and fractions of virtual gear ratios.

13. The machine according to claim 12, wherein the first incremental rate shifts between fractions of gear ratios.

14. The machine according to claim 13, wherein shifting at the first incremental rate terminates at a next integer of a virtual gear ratio.

15. The machine according to claim 12, wherein the second incremental rate shifts to a next integer of a virtual gear ratio.

16. The machine according to claim 15, wherein the second incremental rate terminates until movement of the operator input device to the first position is registered.

17. The machine of claim 10, wherein operator input device is a slider switch.

18. A method of regulating a continuously variable transmission (CVT) associated with a plurality of virtual gear ratios; the method comprising:
    selecting a virtual gear ratio from the plurality of virtual gear ratios;
    registering a first operator input signal from an operator input device;
    increasing the virtual gear ratio selected at a first rate;
    registering a second operator input signal from the operator input device; and
    increasing the virtual gear ratio selected at a second rate.

19. The method of claim 18, wherein the first rate is less than the second rate.

20. The method of claim 19, wherein the plurality of virtual gear ratios includes integers and fractions of virtual gear ratios.

* * * * *